(12) United States Patent
Lettau

(10) Patent No.: US 9,773,525 B2
(45) Date of Patent: Sep. 26, 2017

(54) TIMELINE MANAGEMENT

(75) Inventor: Tyler J. Lettau, Hercules, CA (US)

(73) Assignee: Adobe Systems Incorporated, San Jose, CA (US)

( * ) Notice: Subject to any disclaimer, the term of this patent is extended or adjusted under 35 U.S.C. 154(b) by 2180 days.

(21) Appl. No.: 11/893,638

(22) Filed: Aug. 16, 2007

(65) Prior Publication Data

US 2013/0124990 A1    May 16, 2013

(51) Int. Cl.
*G06F 3/14* (2006.01)
*G11B 27/34* (2006.01)

(52) U.S. Cl.
CPC .................................. *G11B 27/34* (2013.01)

(58) Field of Classification Search
CPC .................................................. G11B 27/34
USPC .............. 715/200–277, 500.1; 700/701–799, 700/800–866; 709/201–229; 705/50–79; 345/30–111; 386/46–131; 84/600; 348/143
See application file for complete search history.

(56) References Cited

U.S. PATENT DOCUMENTS

| | | | | |
|---|---|---|---|---|
| 7,213,051 B2* | 5/2007 | Zhu et al. | | 709/205 |
| 7,569,761 B1* | 8/2009 | Iampietro et al. | | 84/600 |
| 7,669,130 B2* | 2/2010 | Agarwal et al. | | 715/723 |
| 7,843,491 B2* | 11/2010 | Vallone et al. | | 348/143 |
| 2004/0001106 A1* | 1/2004 | Deutscher et al. | | 345/838 |
| 2005/0156932 A1* | 7/2005 | Vienneau et al. | | 345/473 |
| 2006/0224940 A1* | 10/2006 | Lee | | 715/500.1 |
| 2006/0236245 A1* | 10/2006 | Agarwal et al. | | 715/716 |
| 2006/0277454 A1* | 12/2006 | Chen | | 715/500.1 |
| 2007/0022159 A1* | 1/2007 | Zhu et al. | | 709/204 |
| 2007/0078735 A1* | 4/2007 | Wan et al. | | 705/28 |
| 2007/0260968 A1* | 11/2007 | Howard et al. | | 715/500.1 |
| 2007/0268294 A1* | 11/2007 | Eagen et al. | | 345/474 |
| 2008/0253735 A1* | 10/2008 | Kuspa et al. | | 386/52 |
| 2008/0316213 A1* | 12/2008 | Eagen et al. | | 345/474 |
| 2010/0077289 A1* | 3/2010 | Das et al. | | 715/230 |

OTHER PUBLICATIONS

Hullfish, Steve. "Generating Better Effects on Your Media Composer." <http://www.avid.com/resources/tips_techniques/composer_fx_comm.html?featureID=532&marketID=>.

\* cited by examiner

*Primary Examiner* — Ruay Ho

(74) *Attorney, Agent, or Firm* — Wolfe-SBMC

(57) ABSTRACT

Timeline management is described, including selecting a segment of a timeline, activating a control, and replacing the segment of the timeline with a visual indicator used to identify the segment of the timeline.

27 Claims, 7 Drawing Sheets

TIMELINE MANAGEMENT

FIELD OF THE INVENTION

Embodiments relate generally to software and user interfaces and, more specifically to timeline management.

BACKGROUND OF THE INVENTION

Some software applications render data, such as an audio stream or a video clip, on one or more timelines. For example, a five-minute movie trailer created using 30 frames per second ("FPS") can be represented on a timeline of 9000 frames (i.e., 5 minutes×60 seconds/minute×30 FPS=9000 frames) using conventional techniques. However, a timeline can be, and often is, too long to fit in a display screen ("screen"). In some conventional techniques, if each frame is displayed using one pixel, 9000 pixels are needed to display 9000 frames. If a timeline of 9000 pixels is displayed horizontally on a typical screen of 1024 pixels wide, the timeline can require nine screens for a complete display, but be limited to a single screen. Using a single screen, conventional techniques are restricted to showing $\frac{1}{9}^{th}$ of the timeline, excluding other components, such as sub-screens and tool buttons.

In some conventional techniques, applications often use more than one pixel to display a frame. For example, some conventional applications display a frame with at least five pixels. In these applications, the timeline for a 30-FPS (i.e., frame-per-second), five-minute duration video clip with 9000 frames is at least 45000 pixels long (9000 frames×5 pixels/frame). Thus, the typical screen can display at most $\frac{1}{45}^{th}$ of the timeline. As a conventional example, if a video clip is two hours long in duration, a timeline can be 1,080,000 pixels long, which allows for only $\frac{1}{1080}^{th}$ of the timeline to be displayed on a screen. Thus, a user must scroll or move a vertical or horizontal slide bar, scroll wheel or arrow, or other on-screen element to see the rest of the timeline. This can lead to time-consuming, labor-intensive editing, reviewing, and navigation of a file such as those described above.

In some conventional techniques, navigating or scrolling through a long timeline is frustrating and time-consuming. Regardless of whether a movie is divided into portions (e.g., chapters, acts, scenes) the timelines associated with the various portions of a movie can be long and require substantial screen space to display. Further, conventional screens are unable to display these timelines. Further, when editing a movie, audio clip, or animation, some segments have been finalized and require no further editing, but are continuously displayed, thus consuming limited screen space. Conventional solutions that display these unnecessary segments of a timeline are limited and typically require excessive scrolling through finalized segments to get to a non-finalized segment.

Thus, a solution for managing timelines without the limitations of conventional techniques is needed.

BRIEF DESCRIPTION OF THE FIGURES

Various examples are disclosed in the following detailed description and the accompanying drawings.

DETAILED DESCRIPTION

Various embodiments or examples may be implemented in numerous ways, including as a system, a process, an apparatus, or a series of program instructions on a computer readable medium such as a computer readable storage medium or a computer network where the program instructions are sent over optical, electronic, or wireless communication links. In general, operations of disclosed processes may be performed in an arbitrary order, unless otherwise provided in the claims.

A detailed description of one or more examples is provided below along with accompanying figures. The detailed description is provided in connection with such examples, but is not limited to any particular example. The scope is limited only by the claims and numerous alternatives, modifications, and equivalents are encompassed. Numerous specific details are set forth in the following description in order to provide a thorough understanding. These details are provided as examples and the described techniques may be practiced according to the claims without some or all of the accompanying details. For clarity, technical material that is known in the technical fields related to the examples has not been described in detail to avoid unnecessarily obscuring the description.

In some examples, the described techniques may be implemented as a computer program or application ("application") or as a module or sub-component of another application. The described techniques may be implemented as software, hardware, firmware, circuitry, or a combination thereof. If implemented as software, the described techniques may be implemented using various types of programming, development, scripting, or formatting languages, frameworks, syntax, applications, protocols, objects, or techniques, including C, Objective C, C++, C#, ActionScript™, Flex™, Lingo™, Java™, Javascript™, Ajax, COBOL, Fortran, ADA, XML, MXML, HTML, DHTML, XHTML, HTTP, XMPP, and others. Design, publishing, and other types of applications such as Dreamweaver®, Shockwave®, Flash®, and Fireworks® may also be used to implement the described techniques. The described techniques may be varied and are not limited to the examples or descriptions provided.

Various examples of timeline management techniques are described, including compressing and expanding of timelines or segments of timelines. Devices, computing systems, and programming instructions that implement various timeline management techniques are also described. Any data that has a temporal element may be represented with one or more timelines. For example, audio tracks, video clips, and animation objects (e.g., drawings and computer graphics that give an appearance of movement over time) may be displayed using one or more timelines. Similarly, timelines are effective tools for organizing or presenting a plurality of images, events, and data with a time attribute.

Figure 1:
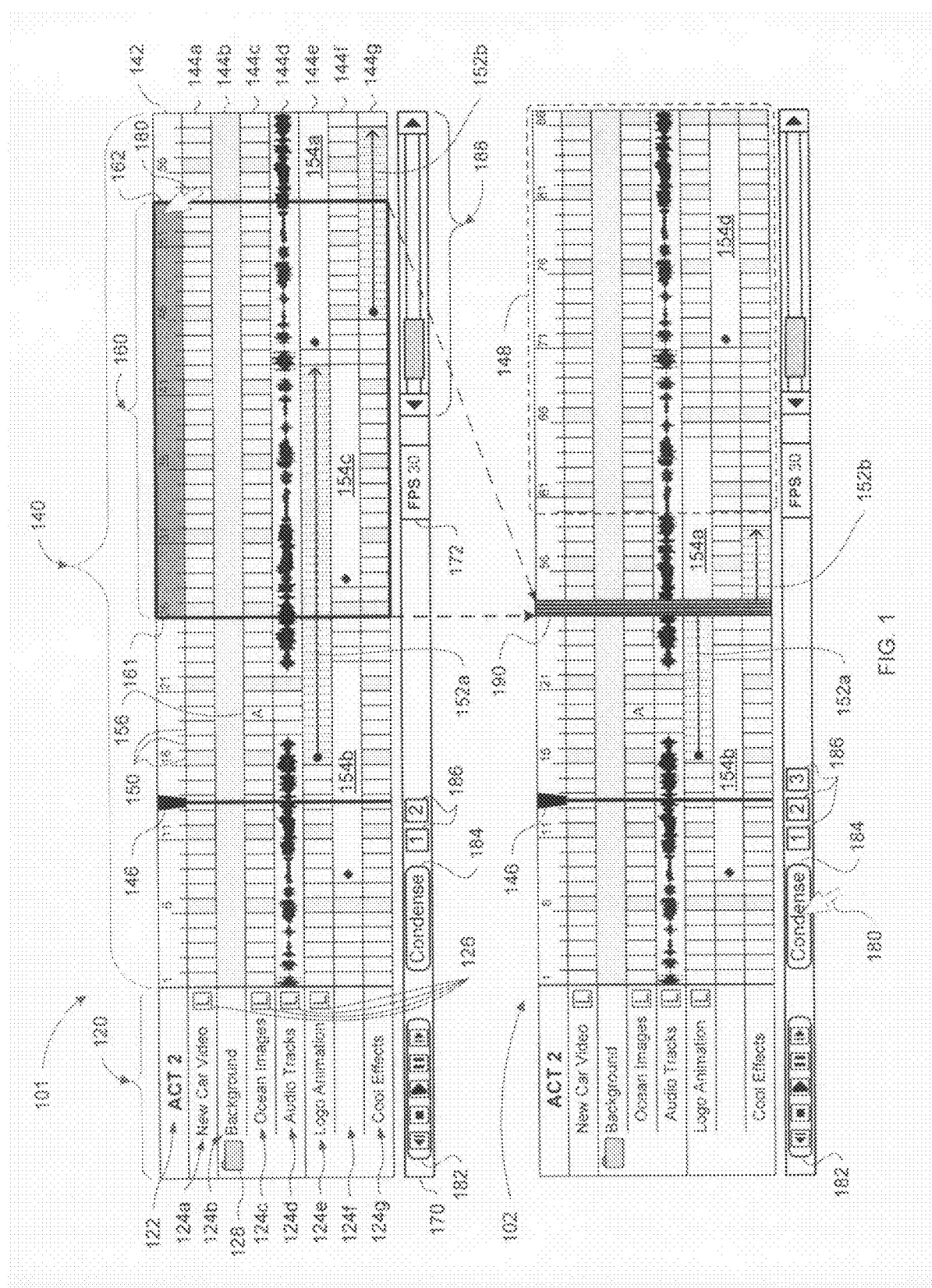
FIG. 1 illustrates an exemplary timeline.

FIG. 1 illustrates an exemplary timeline. One or more examples describe various techniques, procedures, processes, or methods for managing timelines. Timeline 101 includes a title panel 120, a timeline panel 140, and a control and information ("CI") panel 170. In some examples, title panel 120 may include one or more titles, which may be any arbitrary labels. As shown, title panel 120 includes a timeline title 122 and track titles 124a-124g. One or more titles may be empty or blank, such as track title 124f. In some examples, title panel 120 may be excluded or turned off, e.g., not shown.

Here, timeline panel 140 includes a timeline ruler 142, timeline tracks 144a-144g, and a playhead 146. Timeline panel 140 shows the in-view portion of timeline 101, which may include one or more out-of-view portions that may be navigated into view using play controls 182, scrollbar 188, or other navigation controls (not shown). In some examples, timeline panel 140 may be configured to exclude or hide timeline ruler 142, i.e., not showing timeline ruler 142.

In some examples, CI panel 170 may include one or more controls, such as play controls 182, button control 184, timeline controls 186, and scrollbar 188; and one or more information boxes, such as information box 172. As used herein, the term "control" refers generally to any input interface or mechanism. A control may be physically implemented (e.g., a key, button, scroll wheel, trackball, touch screen, tablet, lever, switch, dial, pen, and others) or virtually implemented (e.g., a pointer, button, slide bar, scrollbar, dial, menu selections, or other types of displayed icons or elements). Some examples may include fewer controls and information boxes than shown or additional controls and information boxes beyond those shown in FIG. 1. There may be one or more controls and information boxes outside the CI panel 170 (e.g., pointer 180). In some examples, there is no CI panel 170; controls and information boxes may be placed anywhere.

Timeline 101 includes one or more timeline tracks. As used herein, the term "timeline track" refers generally, in some examples, to a visual representation of a conceptual grouping of one or more objects and assets (e.g., audio clips, video clips, animation objects, images, programming codes, programming objects, action scripts, colors, data sets, and others). For example, timeline track 144a may represent one or more video clips and is given a track title "New Car Video" 124a. Here, timeline track 144c may represent one or more images and has a track title "Ocean Images" 124c. Timeline track 144d may represent one or more soundtracks or audio clips with a tract title "Audio Tracks" 124d. In some examples, timeline tracks 144e-144g each represents one or more objects and assets, including animation objects. In other examples, a timeline track may be a visual separator or an empty track (e.g., timeline track 144b). A timeline track may group together two or more mixed objects and assets, in any combination, such as a video clip, one or more sound tracks, a few animation objects, a number of still images, and a programming object that affects another object's brightness, contrast, color intensity, lighting, opacity, etc. In some examples, one or more timeline tracks, along with their corresponding track titles, may be turned off (i.e., not displaying) and turned on (i.e., displaying).

In some examples, timeline tracks may be implemented as layers or having layer properties. As an example, a layer may include one or more timeline tracks. For example, timeline 101 includes four layers; each is shown with a layer symbol 126 (i.e., title track 124b and 124c-e). The first three layers each includes one timeline track: timeline track 144a with track title "New Car Video" 124a; timeline track 144c with track title "Ocean Images" 124c; and timeline track 144d with track title "Audio Tracks" 124d. The fourth layer includes three timeline tracks 144e-144g and their corresponding tract titles: "Logo Animation" 124e, blank track title 124f, and "Cool Effects" 124g, respectively. Layer properties include, for example, the ability to: (1) hide or show all objects and assets in the same layer, for example, by activating a "view" toggle button (not shown); (2) apply a visual effect to the objects and assets in a layer; (3) assign display precedent, such as displaying an object in a higher layer on top of another object in a lower layer if both objects occupy overlapping space; and (4) lock contents and composition of the layer to prevent, for example, viewing, editing, or printing.

One or more layers may be organized in a folder or other organization structures. For example, indicated by a folder symbol 128, timeline 101 shows a grouping of timeline tracks 144c and 144d in a folder with the track title "Background" 124b. The "Background" folder contains an empty timeline track 144b and two non-empty timeline tracks 144c and 144d. A folder may be expanded to reveal the set of layers or timeline tracks contained therein; closed to hide the layer set; moved; or applied other operations.

Not all enumerated features and properties pertaining to timeline tracks, layers, and folders are included in some examples. In other examples, there may be additional features and properties. For example, there may be selection boxes, toggle buttons, or other input interfaces to control selection, locking, viewing, printing, editing, and other operations.

A timeline track may be divided into any number or type of units or selection points. For example, an audio timeline track may be divided by time units (e.g., seconds, tenths of seconds, hundredths of seconds, milliseconds, or others). A timeline track may be viewed differently by zooming in and zooming out to display the desired scale for viewing, selecting, or other purposes.

A video or animation timeline track may be divided by time units or any other type of units. Commonly, timeline tracks for video or animation are divided by frames, making frames selection points (i.e., points selectable for content editing or manipulating the timeline tracks). For illustration purposes, video streams and animation streams in FIG. 1 are encoded at a frame rate of 30 frames per second ("FPS"), according to information box 172. As such, three frames 16-18 150 on timeline track 144a total to one tenth of a second (0.1) of play time. In practice, video streams, including movies and television shows, and animation streams, including cartoons and animated computer graphics, may be encoded at any frame rate. Examples of frame rates are: 1, 2, 5, 10, 12, 15, 24, 25, 30, 48, 50, 60, 75, 120, 160, 386, or others. In high speed applications, frame rates may range from a thousand ("K") FPS to billions of FPS, such as 1000 (1K), 5K, 40K, 50K, 95K, 125K, 250K, one million, 25 millions, and 50 billions FPS.

In some examples, objects and assets may be visually represented on a timeline track in any manner or using any type of arbitrary symbols. For example, a video stream (e.g., "New Car Video" timeline track 144a) may be represented with any symbols (not shown); with blank frames, as shown; or with one or more thumbnails of the video frames as shown on timeline 201 of FIG. 2A. Still images (e.g., "Ocean Images" timeline track 144c) may be represented similarly using, for example, thumbnails or other elements.

Further, objects and assets such as programming codes, action scripts, colors, and data sets may be represented, for example, by a symbol indicating these objects or assets are being run, selected, in effect, or otherwise used. For example, an action script that starts executing on frame 19 of timeline track 144c may be represented by the symbol "A" 156. In some examples, action scripts may be computer program or software code that, when executed, results in fading or transitioning from one object to another object. In other examples, action scripts may be implemented differently than as described above.

Timeline track 144*d* shows that a sound clip may be represented, for example, by a symbol of a waveform or spectrogram. In some examples, a waveform or spectrogram may be an actual representation of the contents of a sound clip.

Animation objects may be represented using various techniques, including those described above. In some examples, an animation object may be shown with a symbol covering a length on the timeline track, where the object resides, equal to the duration of the object's existence. For example, timeline track 144*e* includes at least two animation objects 152*a* and 154*a* (i.e., there may be more objects on the invisible portions of timeline track). Animation object 152*a* may be represented by, for example, an arrow from frame 16 to frame 42, the duration of the object. Animation object 154*a* may also be represented by, for example, blocking frame 44 to frame 64 (timeline 102) to indicate the duration of object 154*a*. Different types of animation objects, such as objects 152*a* and 154*a*, may be represented differently, as shown. In some examples, different types of animation objects are represented similarly or with blank frames.

In some examples, the first frame an object starts to appear may be referred to as a keyframe. For example, on timeline track 144*e*, frame 16 and frame 44 may be considered keyframes because these are the starting frames for objects 152*a* and 154*a*, respectively. In other examples, keyframes may be indicated differently from non-keyframes, for example, with a diamond, a dot, or other symbol, such as those used with objects 152*a*, 152*b*, 154*a*-154*c*, and 154*d*.

In some examples, a segment, section, or portion of a timeline (e.g., timeline 101 or 102) may be selected in various ways. For example, a segment (e.g., segment 160) may be selected using a mouse, keyboard, on-screen tool or icon, or any type of user interface or input/output device. First point 161 may be identified by selecting frame 26 on timeline ruler 142. Similarly, selecting frame 53 of timeline ruler 142 identifies second point 162. As an example, segment 160 may be selected by moving pointer 180 to first point 161, and then moving pointer 180 over to second point 162 and selecting it. In other examples, the selection order of first point 161 and second point 162 may be reversed. In some examples, applications that allow labeling portions, sections, or segments of a timeline, such as naming a segment as act 1, scene 4, chapter 3, or any arbitrary label, may be used with the described techniques for selecting a timeline segment based on selecting one or more labels. In still other examples, first point 161 and second point 162 may be selected differently and are not limited to the use of any specific type of user interface, input/output device, on-screen icon, element, or widget. In some examples, once first point 161 and second point 162 have been selected, the segment between these points (e.g., segment 160) may be distinctively marked, as shown on timeline 101.

In some examples, a timeline (e.g., timeline 101 or 102) or a portion thereof (e.g., segment 160) may be managed by selecting and condensing a given set of frames. In some examples, condensing may refer to compacting, collapsing, reducing, locking, hiding, removing, changing, replacing, or otherwise modifying from view ("condensed") a segment. In other examples, condensing may be determined differently. For example, pressing the "Condense" button control 184 before or after selecting frame 26 to frame 53 on any timeline track condenses segment 160 into vertical bar 190. In other words, frames of a segment may be visually condensed to save screen space and instead represented using, for example, vertical bar 190 or another on-screen element. Here, when frames 26-53 (e.g., segment 160) are condensed, data (e.g., audio, visual, video, image, and others) associated with these frames may also be condensed, i.e., hidden from view. As an example, selecting frames 26 to 53 for condensation on timeline track 144*e* may be achieved by selecting segment 160. In some examples, in the context of timeline selection, selecting a frame on a timeline track (e.g., frame 26 on timeline track 144*e*) selects the same frame in all layers and folders and on all timeline tracks 144*a*-144*f*. Thus, the result is selecting a column of frames (e.g., frame column 26 on timeline 101) that may be condensed.

In some examples, a user interface includes one or more graphical marquee tool and other tools. In these embodiments, a segment of a timeline, for example, segment 160 of timeline 101, can be selected by dragging the marquee tool or other tool to enclose frames 26-53 on one or more timeline tracks 144*a*-144*g*.

In some examples, a timeline may include keyframes (i.e., a selection point may be a keyframe). For example, object 154*b* on timeline track 144*f* spans frames 8 to 22, with frame 8 being a keyframe. Clicking on or selecting any frame from 8 to 22 selects the keyframe (e.g., frame 8). In at least one example, object 154*b*, frames 8-22, is selected when any of its frames is selected. For example, selecting a segment from any one of frames 8-22 (object 154*b*) to any one of frames 28-42 (object 154*c*) selects a segment from objects 154*b*-154*c* (frames 8-42) on timeline track 144*f*. A frame, in the context of timeline selection, may refer to a column of frames, or column. In other examples, keyframes may be implemented differently and are not limited to the examples provided and described.

In some examples, a segment of a timeline, such as segment 160 on timeline 101, may be managed, acted upon, or otherwise manipulated (e.g., condensed) in response to a user input. Timeline 102 illustrates the result of timeline 101 after a segment of its timeline has been condensed according to some examples. Segment 160 may be selected using any selection techniques, such as those described above. A user input may be provided by pressing a key, button, combination of two or more keys and/or buttons, or the like; clicking or pressing on a pointer (e.g., a mouse pointer); entering one or more values; or a combination of two or more user input methods. In response to or in connection with a user input, a segment (e.g., segment 160) may be compressed, compacted, condensed, collapsed, reduced, locked, hided, removed from view, changed in view, replaced, or otherwise modified. In some examples, a compacted, compressed, collapsed, or otherwise condensed segment may be expanded by another user input or the same user input/control that causes the compaction or condensation. In other examples, segments may be condensed differently in response to user inputs and are not limited to the examples shown and described.

In some examples, timeline 102 shows that segment 160 may be removed and replaced by vertical bar 190 in response to a user input, as described above. In some examples, instead of vertical bar 190, a tear mark (i.e., a visual or symbolic representation that indicates that a portion of a timeline has been "torn off" or otherwise visually removed), a thick line, another marker, or another visual indicator used to identify section 160 may be displayed. In other examples, the length of segment 160 may be displayed, for example, in an information box, in close proximity to vertical bar 190. The length of a segment may be measured in time (e.g., 0.93 second), number of frames (e.g., 28 frames), or another unit.

In some examples, replacing a segment does not require removing the segment. For example, the frames on each timeline track within segment 160 may be replaced with, for example, blank frames or gray frames. In addition, frame borders may be removed to make segment 160 appears as a single frame or box.

In some examples, a visual indicator or another marker (e.g., vertical bar 190) used to visually represent a timeline segment (e.g., segment 160) may occupy less presentation space (i.e., display or on-screen) than the timeline segment. Thus, opening up space for an off-screen or out-of-view portion of a timeline to be displayed or shifted into view. For example, on timeline 102, vertical bar 190, which represents a 28-frame segment 160, occupies the space of one frame (opening up space for displaying 27 frames). As such, frames 60-86, a 27-frame segment 148, may be displayed on timeline 102.

In some examples, a timeline may be implemented with additional timeline controls, such as timeline controls 186. Additional timeline controls facilitate condensing, expanding, using, editing, displaying, navigating, and otherwise managing a timeline. In addition to or in place of vertical bar 190, a button may be added to timeline controls 186. For example, on timeline 101, two buttons (e.g., "1" and "2") are shown with timeline controls 186. After segment 160 has been replaced with vertical bar 190 on timeline 102, a third button "3" is added to timeline controls 186. Button "3" of timeline controls 186 may be associated with segment 160. Button "3" may be configured as a toggle button that, when activated, allows toggling between expanding (i.e., displaying), as shown on timeline 101, or condensing segment 160 with vertical bar 190, as shown on timeline 102.

In some examples, a visual indicator or marker, such as vertical bar 190, may be configured as a user input control. As such, clicking on or double clicking on the visual indicator may expand the timeline segment identified by the visual indicator (e.g., vertical bar 190). For example, clicking or double clicking on vertical bar 190 may cause segment 160 to be expanded on timeline 101. In other examples, a condensed segment may be expanded and displayed when a different user input is detected. The above-described timeline operations and management techniques and elements may be varied in design, implementation, and function and are not limited to the descriptions provided.

In some examples, a visual indicator or marker (e.g., vertical bar 190) used to identify a segment of a timeline does not affect any timeline operations. In operation, a timeline may be in one of various modes (e.g., edit or play mode, and others), with or without indication of which mode the timeline is in. In edit mode, each frame column may be viewed by selecting that frame column, for example, by clicking on any frame in that column. When a frame column is selected for viewing or editing, playhead 146 may be implemented to move to that column. Contents of any frame in the column may be edited or modified. To view successive frames, playhead 146 may be dragged across the frames to be viewed, in a forward or backward motion. (Dragging the playhead across frames is commonly referred to as "scrubbing the playhead" or simply "scrubbing.") For example, to view frames 21-60 on timeline 102, scrub playhead 146 across those frames, including vertical bar 190.

In other examples, a timeline in play mode may have timeline functions and operations that are unaffected by any hidden or condensed segment. Here, play controls 182 may include functions such as: play one frame backward, stop, play, pause, and play one frame forward. Frames of a timeline may be played continuously by pressing or clicking on the play button. Frames may be played backward or forward, one frame at a time, with, for example, the "play one frame" buttons. When playing, for example, frames 26-53 on timeline 102, which are hidden under vertical bar 190, contents of frames 26-53 may be played similarly to playing frames on timeline 101. In playing frames 26-53, a total of 28 frames, playhead 146 will remain on vertical bar 190 for the time duration of playing 28 frames.

In some examples, a visual indicator does not affect the operations of folders, layers, timeline tracks, objects and assets. When condensed, a timeline segment represented by a visual indicator may be transparent to folders, layers, timeline tracks, and any similar structures. The operation of other structures, such as adding, deleting, relocating, changing contents, and the like may remain unaffected.

In other examples, operation of objects and assets is unaffected by condensing or otherwise managing a timeline segment (e.g., timeline segment 160). For example, animation objects 152a on timeline track 144e may be a tweening object. In a tweening object, a user determines the shape, size, color, and/or position of the object in the initial keyframe (frame 16 on timeline track 144e) and in the last frame (frame 42). An animator (i.e., user) or computer (i.e., processor) generates and fills in the intermediate frames to create a transition of an object from a keyframe to the last frame. If the object (i.e., between a keyframe and last frame) changes position, rotation, or both, tweening may be referred to as a motion tween. If an object changes size, scale, shape, colors, gradients, or into another object, the tweening may be referred to as shape tweening or morphing. As an example, object 152a, which may be a motion or shape tween, operates in every frame, including frames 26-42, which are condensed and hidden from view on timeline 102. Similarly, object 154c, which is enclosed within segment 160 on timeline 101 and hidden under vertical bar 190 on timeline 102, may be any object, and its operations are not affected by the condensation of segment 160. In other examples, different types of operations (e.g., other types of tweens) may be used and operate without being affected by the techniques described above. Further, the examples provided may be varied in implementation, design, function, processes, and other aspects, and are not limited to those shown and described.

Figure 2A:
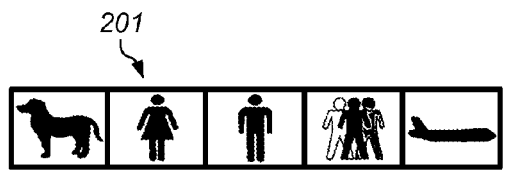
FIGS. 2A-2E illustrate alternative exemplary timelines.

FIGS. 2A-2E illustrate alternative, exemplary timelines. FIG. 2A shows an example of timeline 201 that displays thumbnails in the timeline frames. Timeline 201 may be a timeline associated with a file or set of files of any type of content (e.g., still images, video streams, animation objects, audio tracks, or a combination thereof). Here, timeline 201 shows an example of a timeline that includes a single track. In other examples, timeline 210 may display a timeline ruler and additional timeline tracks.

Figure 2B:
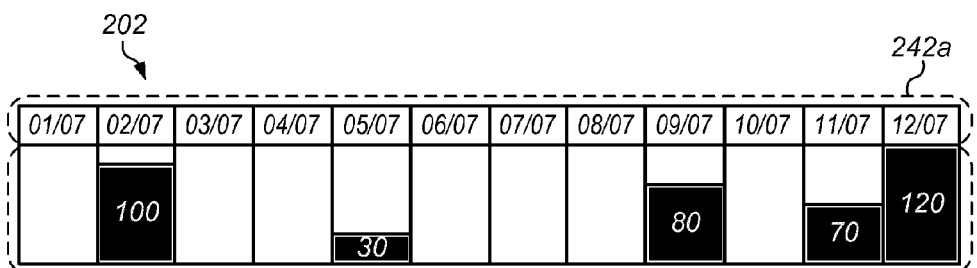

FIG. 2B shows an example of another timeline, including the display of a timeline ruler. Here, timeline 202 may represent, for example, still images taken in the months of, for example, year 2007. In some examples, timeline ruler 242a displays months of a year as ruler units or selection points. Further, segments of a timeline track may be void of content, such as "01/07," "03/07"-"04/07," "06/07"-"08/07," and "10/07." Additionally, content associated with a frame, ruler unit, or selection point may be represented using various techniques, including representing some, all, or none of the content. For example, frame "02/07" represents the total number of images taken in February (i.e. 100 images), frame "05/07" represents 30 images, frame "09/07" represents 80 images, frame "11/07" represents 70 images, and frame "12/07" represents 120 images. Still further, a timeline may be configured to activate a control or a combination of controls that affect one or more segments of the timeline without selecting any segment of a timeline. For example, without selecting any segment on timeline 202, the "Condense" button control 184 (FIG. 1) may be used to replace the content-void segments of two or more frames (e.g., frames "03/07" through "04/07" and frames "06/07" through "08/07") with visual indicators. In other examples, all content-void frames may be condensed or removed, yielding timeline 203 of FIG. 2C.

Figure 2C:
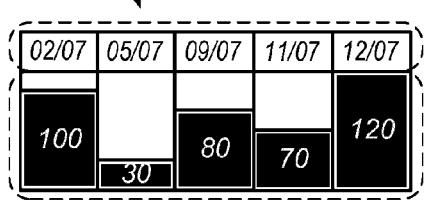

FIG. 2C also illustrates time periods for two consecutive or successive selection points may be different. Here, timeline 203 shows five selection points: "02/07," "05/07," "09/07," "11/07," and "12/07," representing months of a year (e.g., 2007). Excluding the selection points, the time period between "02/07" and "05/07" is two months, the time period between "05/07" and "09/07" is three months, the time period between "09/07" and "11/07" is one month, and there is no time period between "11/07" and "12/07."

Figure 2D:
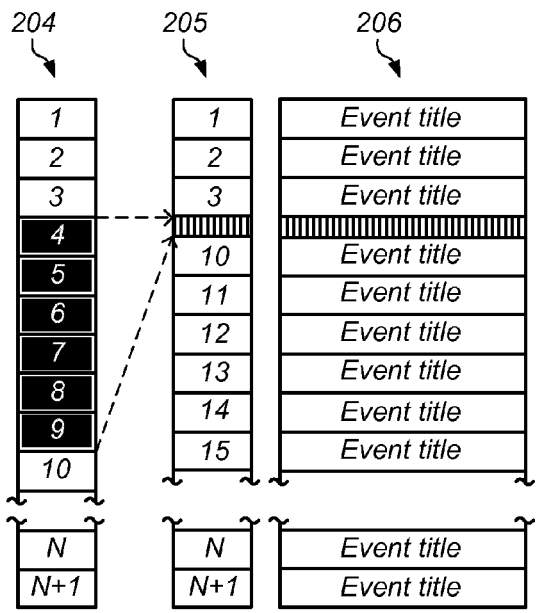
Figure 2E:
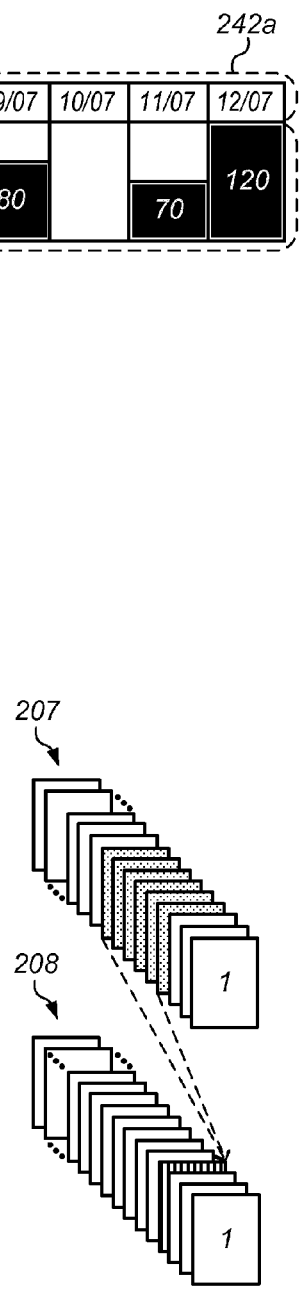

FIGS. 2D and 2E illustrate that a timeline may be represented using various techniques. In FIG. 2D, timeline 204 and its condensed version, timeline 205, are represented vertically. In some examples, timeline 204 or 205 may be accompanied by a table structure 206, which may include data associated with, for example, a plurality of events (e.g., historic events). In other examples, table structure 206 may be used to store and provide data associated with capsule summaries, titles, or other information related to the events. In other examples, table structure 206 may be used differently and is not limited to the examples provided.

FIG. 2E illustrates timeline 207 and its condensed form, timeline 208, displayed in three dimensions. Timelines 207-208 are displayed differently than the horizontally-displayed timeline 101 (FIG. 1) and the vertically-displayed timeline 204 (FIG. 2D). In other examples, a timeline may be displayed using any contour, curve, shape, or other geometric form such as a wavy line, semicircle, circle, triangle, rectangle, square (e.g., showing frames of a timeline near the edges of a view, panel, window, or display), or others. In still other examples, the above-described timelines may be displayed differently and are not limited to the examples shown and provided.

Figure 3A:
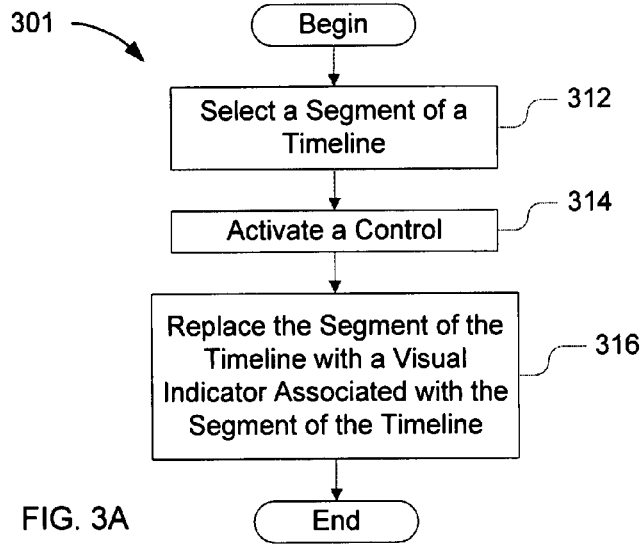
FIGS. 3A-3C are exemplary flow diagrams of various processes for managing a timeline.
Figure 3B:
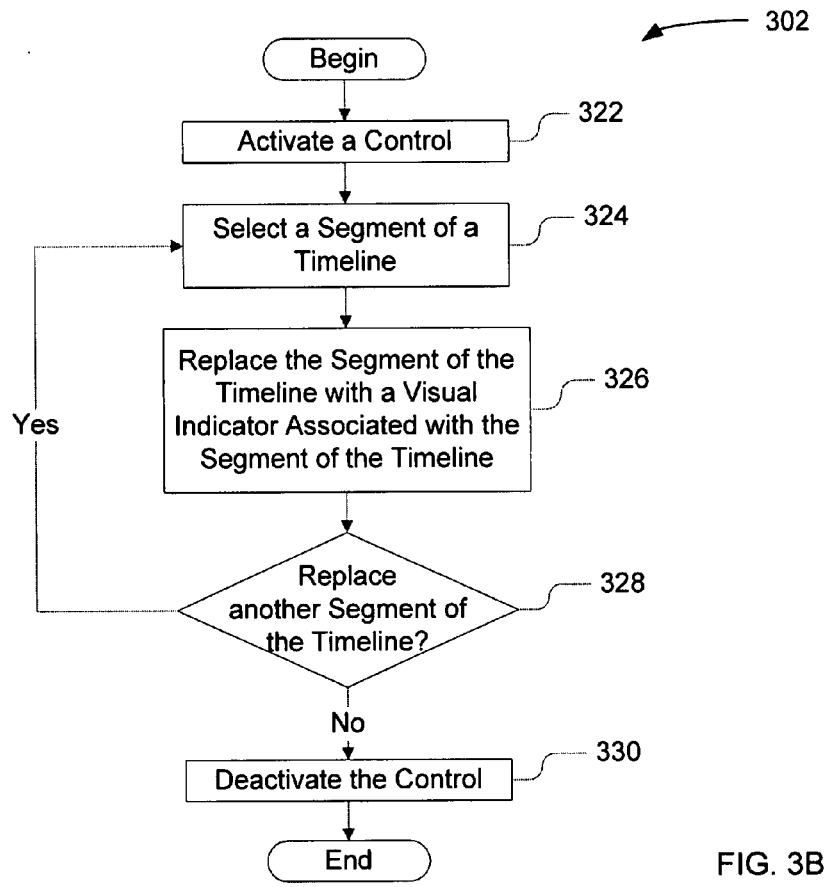
Figure 3C:
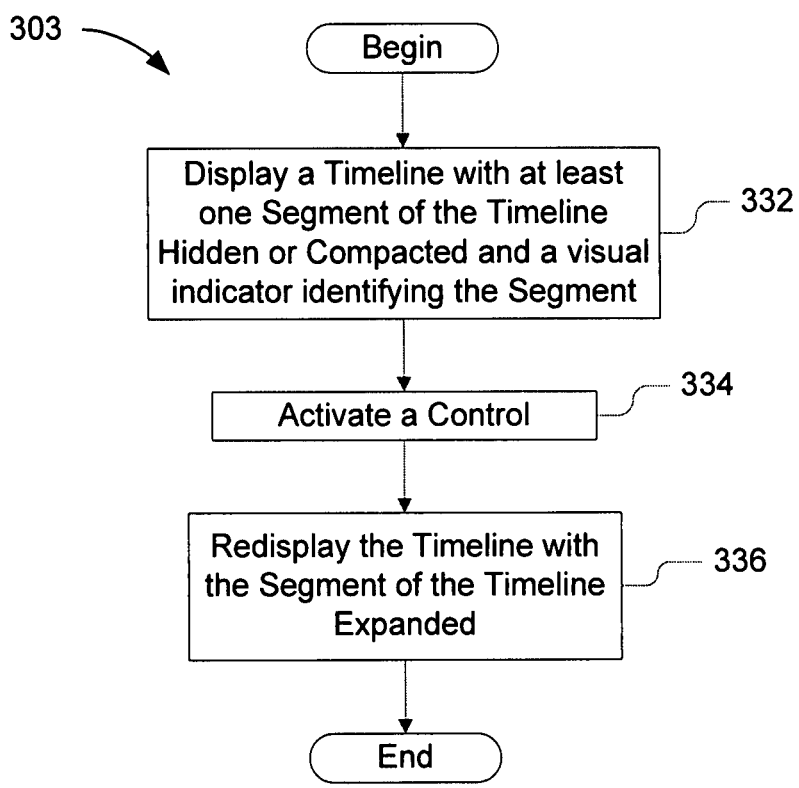

FIGS. 3A-3C are exemplary flow diagrams of various processes for managing a timeline. FIG. 3A is a flow diagram depicting one example of a method for managing a timeline, according to various examples. Here, process 301 begins with a timeline. A segment of the timeline is selected (312). In some examples, a segment may be selected using the techniques described above or a combination thereof. After a segment of the timeline is selected, a control is activated (314). A control, for example, may be a signal from a button, key, mouse, track point, trackball, or other user input device. In other examples, a control may be a combination of signals from one or more user input devices. A selected segment of the timeline is then replaced, as described above, and identified using a visual indicator (316). Alternatively, a button associated with the selected segment may be added to a set of timeline controls. In still other examples, the above-described process may be varied and is not limited to the examples shown and described.

FIG. 3B is another exemplary process flow diagram illustrating timeline management. Here, process 302 begins with a timeline. Process 302 illustrates that a control may be activated (322) before a segment of a timeline is selected (324). A control, for example, may be one described, such as a button, key, mouse, track point, trackball, or other user input device. A segment of a timeline may be selected, for example, using a technique described above. Replacing the selecting segment of the timeline with a visual indicator (326) may be performed as described above or in other manner. Activating a control before selecting a segment of a timeline put the timeline into a "timeline segment replacement mode," where two or more timeline segments may be replaced with fewer user inputs. At decision 328, replacing another timeline segment may be achieved by proceeding to selecting another timeline segment (324). Note that activating a control (322) is performed once at the beginning of process 302, and does not require to be performed again. At decision 328, if there are no more segments to be replaced, process 302 advances to deactivating the control (330). Deactivation may be considered as exiting the "timeline segment replacement mode." Deactivation may be done by the same control or user input used in activation (322). In some examples, deactivation may be done using a different user input or control. For example, pressing the "Esc" or "Escape" key on the keyboard. In other examples, the above-described process may be varied and is not limited to the examples shown and described.

FIG. 3C is a process flow diagram illustrating an alternative process 303 for timeline management. In some examples, a timeline may be displayed (332). As an example, a timeline may have at least one segment condensed and a visual indicator identifying the segment. A control is activated (334). A control may be, for example, a signal from a button, key, mouse, track point, trackball, or other user input device. In other examples, a control may be a combination of signals from user input devices, such as those described above. In response to activating a control, a timeline may be redisplayed, replacing a visual indicator with the expanded content and data associated with a condensed segment (336). In other examples, a visual indicator may be configured as a control that, upon activation, causes a segment of a timeline to be expanded and displayed. In other examples, the above-described process may be varied in design, order, implementation, or other aspects, and is not limited to the examples shown and described.

Figure 4:
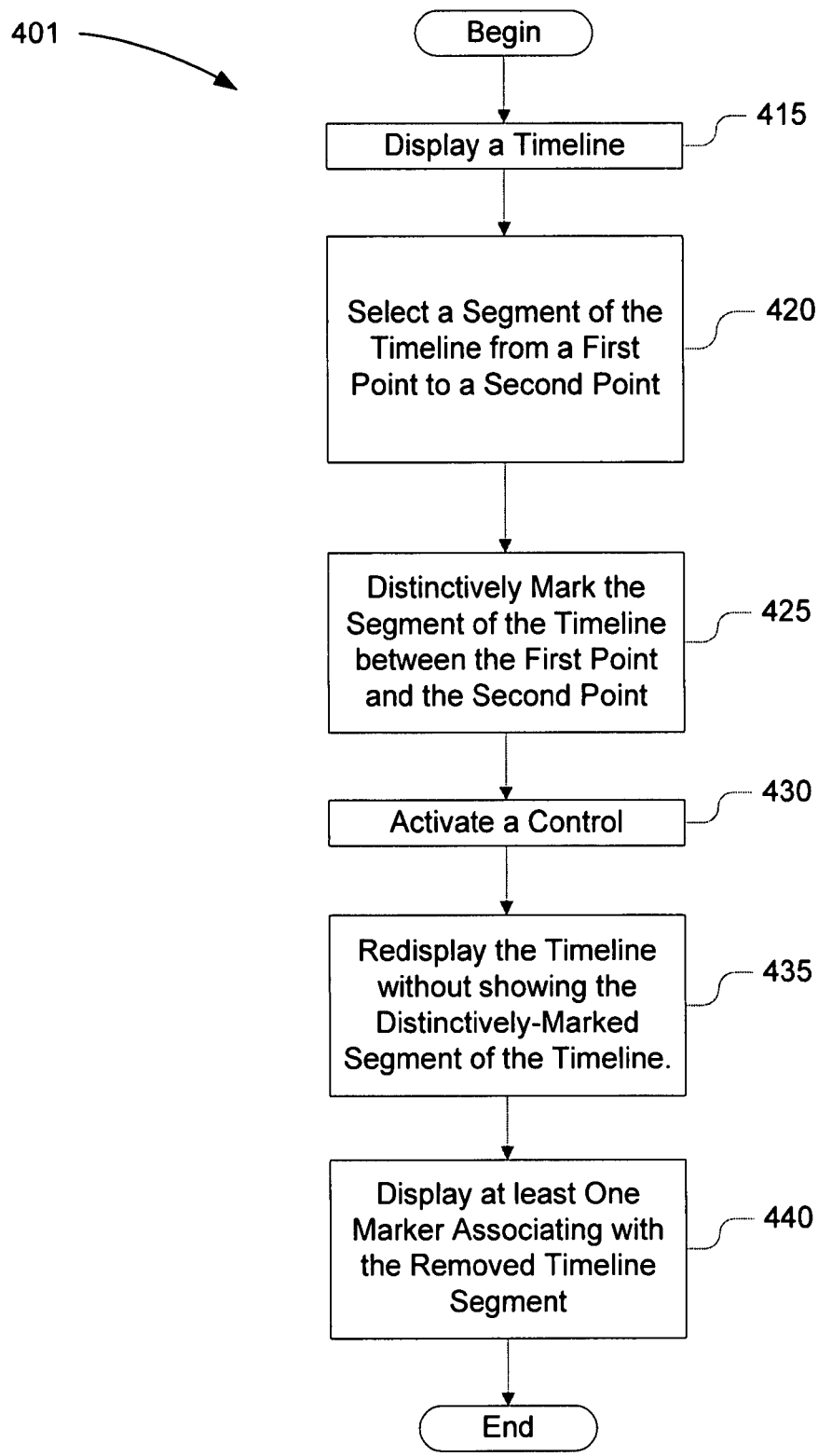
FIG. 4 is an alternative exemplary flow diagram for timeline management.

FIG. 4 is an alternative exemplary flow diagram for timeline management process 401. In some examples, a timeline may be displayed (415). A segment of the timeline is selected between a first point and a second point (420). A selected segment may be identified using various techniques, such as those described above. A selected timeline is distinctively marked (425). A control is activated in response to input received from a user or system-generated input (i.e., computer or processor-generated input) (430). A timeline is redisplayed in its condensed form without showing the distinctively marked segment of the timeline (435). A marker or visual indicator (e.g., a tear mark with rugged or irregular edges, and others) may be displayed with the condensed timeline (440). Additional visual indicators, timeline control buttons, and information about the length of the removed timeline segment may be displayed. In other examples, the above-described process may be varied in design, order, implementation, or other aspects, and is not limited to the examples shown and described.

Figure 5:
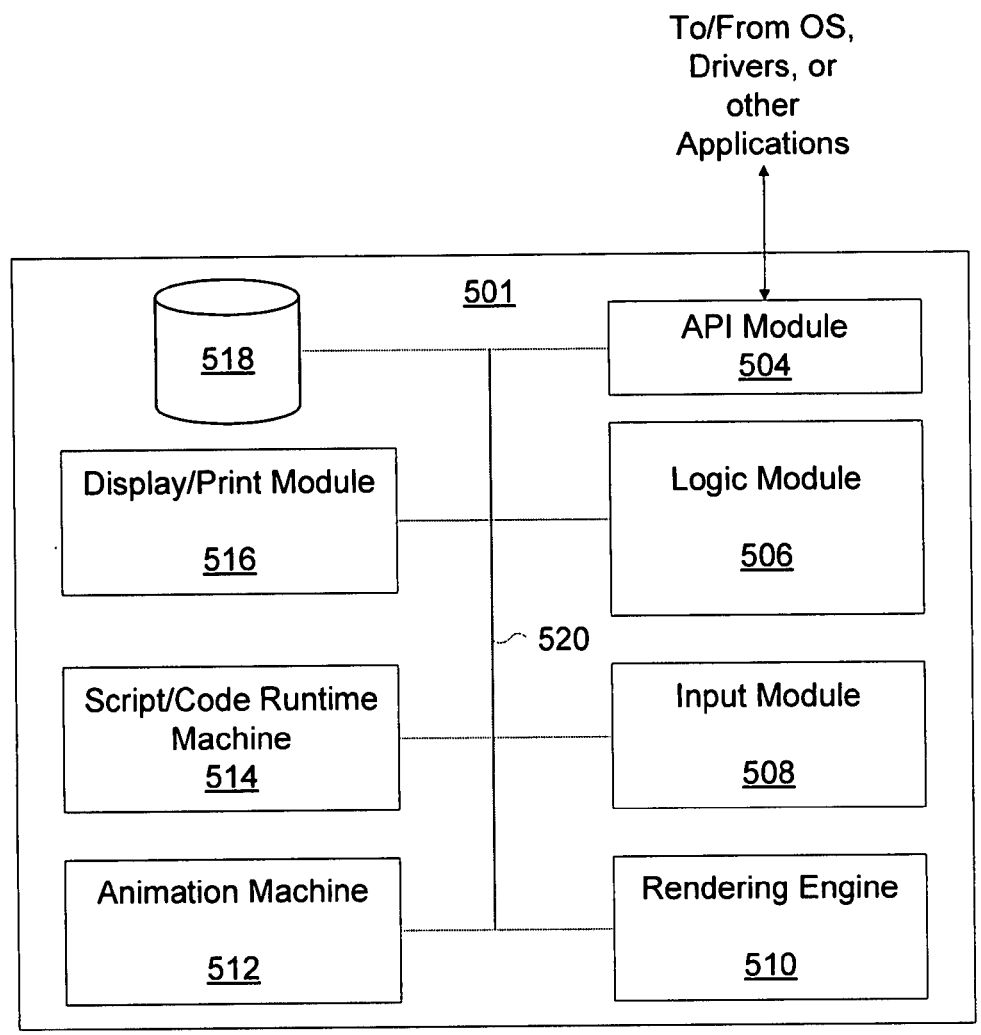
FIG. 5 illustrates an exemplary application for timeline management.

FIG. 5 illustrates an exemplary application for timeline management. Here, application 501 includes application programming interface ("API") module 504, logic module 506, input module 508, rendering engine 510, animation machine 512, script/code runtime machine 514, display/print module 516, repository 518, and bus 520. In some examples, API module 504, logic module 506, input module 508, rendering engine 510, animation machine 512, script/code runtime machine 514, display/print module 516, and repository 518 may be in data communication with each other, other applications, operating systems, drivers, or the like using bus 520, which may be a logical or physical coupling configured to allow data transfer between processes such as those described. Further, API module 504 may be in data communication with one or more external processes (not shown) using actual or physical ports (not shown), processes, or other data interfaces. Other external processes may include, but are not limited to operating systems ("OS"), drivers (e.g., input/output drivers), firmware, applications, state machines, virtual state machines, and others.

In some examples, when data is received by API module 504, it may be transferred to one or more other modules (e.g., logic module 506, input module 508, rendering engine 510, animation machine 512, script/code runtime machine 514, display/print module 516, repository 518, and others) using bus 520. For example, after display/print module 516 has displayed a timeline, API module 504 may receive from an input driver (not shown) input data, for example, to select a timeline segment, activate a control, or scrub a playhead. The input data may be transferred to input module 508 for interpretation (e.g., which control has been activated) and transferred to display/print module 516 to display a timeline (e.g., with a segment of the timeline replaced by a visual indictor).

In some examples, logic module 506 may be configured to control the data flow through bus 520 and direct the services provided by API module 504, input module 508, rendering engine 510, animation machine 512, script/code runtime machine 514, display/print module 516, and repository 518 in order to implement timeline management techniques according to various embodiments described. For example, a timeline may include one or more sound clips, video clips, animation objects, and action scripts in repository 518. In response to a scrubbing or playback request, logic module 506 may direct rendering engine 510 to render the sound clips and video clips according to a frame rate and display precedent such as described above.

Logic module 506 may direct animation machine 512 to generate the animation objects. Here, animation machine 512 may be configured to generate (i.e., provide) the intermediate frames of an object from a keyframe to the last frame. For example, creating an animation effect of a transition, motion tween or shape tween. Further, logic module 506 may be configured to control how action scripts are executed (e.g., directing script/code runtime machine 514 to run action scripts or code).

In other examples, display/print module 516 may be configured to distinctively mark a selected timeline segment. In other words, display/print module 516 may be used to provide feedback to a user's input signal (e.g., showing the selected segment). Further, display/print module 516 may be configured to present a timeline differently on a screen display or printed medium (e.g., on paper), according to additional display parameters and print parameters. For example, a display parameter may indicate that a condensed segment of a timeline should be replaced with a visual indicator on screen and a print parameter may indicate that a condensed segment of the timeline should be expanded and printed on paper. In other examples, application 501 and the above-described elements may be varied in design, function, configuration, or implementation and are not limited to the descriptions provided above.

Figure 6:
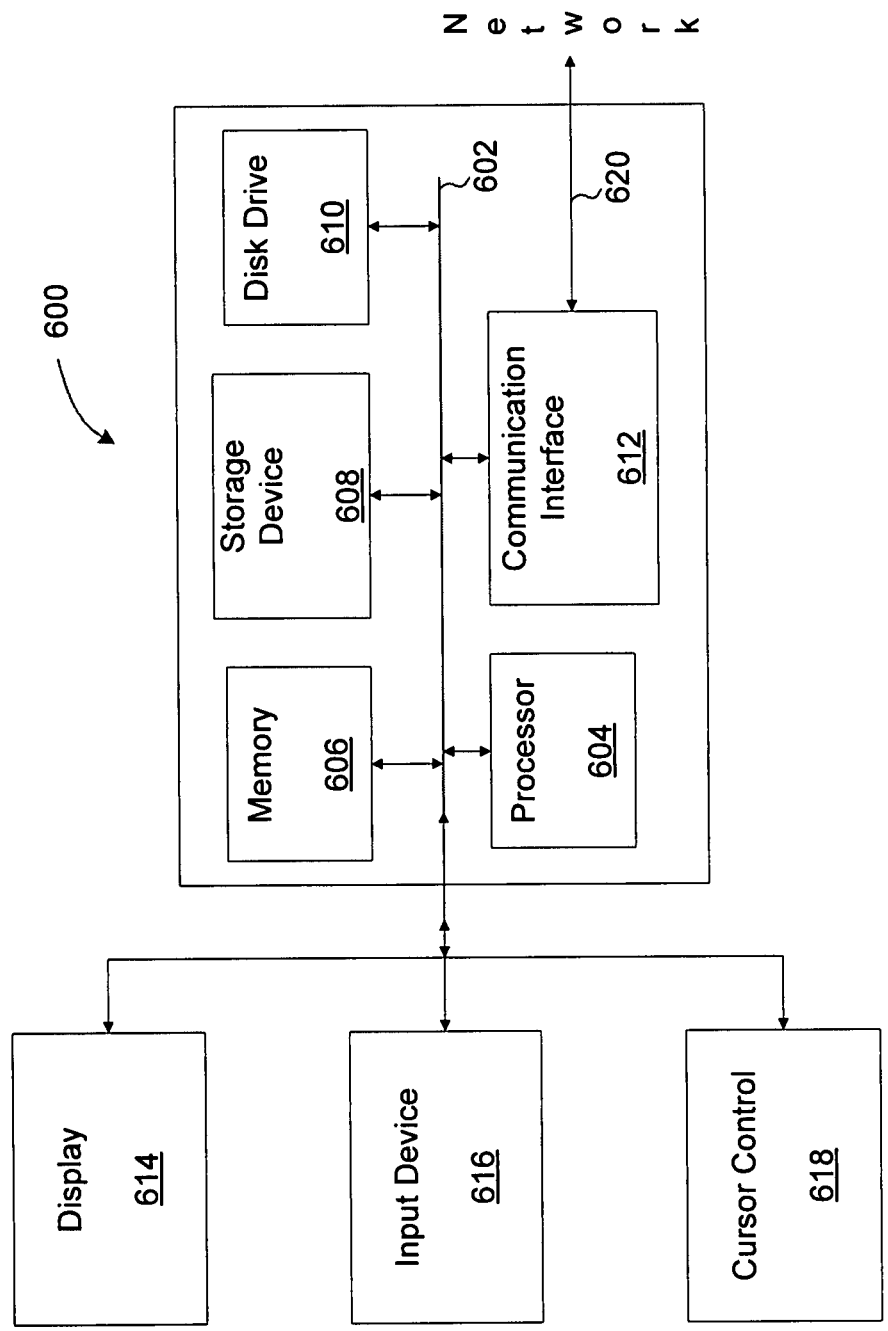
FIG. 6 illustrates an exemplary computer system suitable for timeline management.

FIG. 6 illustrates an exemplary computer system suitable for timeline management. In some examples, computer system 600 may be used to implement computer programs, applications, methods, processes, or other software to perform the above-described techniques. Computer system 600 includes a bus 602 or other communication mechanism for communicating information, which interconnects subsystems and devices, such as processor 604, system memory 606 (e.g., RAM), storage device 608 (e.g., ROM), disk drive 610 (e.g., magnetic or optical), communication interface 612 (e.g., modem or Ethernet card), display 614 (e.g., CRT or LCD), input device 616 (e.g., keyboard), and cursor control 618 (e.g., mouse or trackball). Processor 604 can be a single-core, dual-core, or multi-core processor; and processor 604 can be a processor in a multi-processor environment or a distributed processing environment.

According to some examples, computer system 600 performs specific operations by processor 604 executing one or more sequences of one or more instructions stored in system memory 606. Such instructions may be read into system memory 606 from another computer readable medium, such as static storage device 608 or disk drive 610. In some examples, circuitry may be used in place of or in combination with software instructions for implementation.

The term "computer readable medium" refers to any medium that participates in providing instructions to processor 604 for execution. Such a medium may take many forms, including but not limited to, non-volatile media, volatile media, and transmission media. Non-volatile media includes, for example, optical or magnetic disks, such as disk drive 610. Volatile media includes dynamic memory, such as system memory 606. Transmission media includes coaxial cables, copper wire, and fiber optics, including wires that comprise bus 602. Transmission media can also take the form of acoustic or light waves, such as those generated during radio wave and infrared data communications.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer can read.

In some examples, execution of the sequences of instructions may be performed by a single computer system 600. According to some examples, two or more computer systems 600 coupled by communication link 620 (e.g., LAN, PSTN, or wireless network) may perform the sequence of instructions in coordination with one another. Computer system 600 may transmit and receive messages, data, and instructions, including program, i.e., application code, through communication link 620 and communication interface 612. Received program code may be executed by processor 604 as it is received, and/or stored in disk drive 610, or other non-volatile storage for later execution.

The foregoing examples have been described in some detail for purposes of clarity of understanding, but are not limited to the details provided. There are many alternative ways and techniques for implementation. The disclosed examples are illustrative and not restrictive.

What is claimed:

1. A method, comprising:
    displaying, by a computer, a timeline comprising multiple frames within a user interface;
    receiving user input to select, from within the displayed timeline, a segment comprising two or more frames of the multiple frames;
    visibly marking the segment comprising two or more frames to indicate that the segment is selected in response to receiving the user input;
    detecting additional user input to a visible user interface element displayed within the user interface for activating a condensing control while the segment is selected and the two or more frames are each visibly displayed within the selected segment; and
    visibly condensing the selected segment on the displayed timeline in response to said detecting of the additional user input activating the condensing control, the visibly condensing the selected segment comprising replacing the two or more frames with a visual indicator on the timeline to represent the condensed selected segment.

2. The method of claim 1, wherein the timeline is associated with at least one of an animation object, a video clip, an audio track, a set of images, or a plurality of events.

3. The method of claim 1, wherein the timeline comprises at least a first time period between a first pair of successive selection points in the timeline and a second time period between a second pair of successive selection points in the timeline, wherein a first length of the first time period is substantially equal to a second length of the second time period.

4. The method of claim 1, wherein the receiving the user input to select the segment comprises receiving user input to select at least two columns on the timeline, wherein each column comprises a plurality of timeline tracks.

5. The method of claim 1, wherein said detecting the additional user input activating the condensing control comprises detecting input from a user input device pressing a button user interface element.

6. The method of claim 1, wherein the visual indicator uses less space to display than the segment of the timeline.

7. The method of claim 1, wherein the visual indicator is a tear mark.

8. The method of claim 1, further comprising displaying a value representing a length of the segment of the timeline.

9. The method of claim 1, further comprising adding a button associated with the segment of the timeline, wherein pressing the button toggles between displaying the segment of the timeline and displaying the visual indicator.

10. A system, comprising:
    at least a memory and a processor configured to perform operations comprising:
        displaying a timeline comprising multiple frames within a user interface;
        receiving user input to select, from within the displayed timeline, a segment comprising two or more frames of the multiple frames; and
        visibly marking the segment comprising two or more frames to indicate that the segment is selected in response to receiving the user input;
        visibly condensing the selected segment on the displayed timeline in response to detecting additional user input to a visible user interface element for activating a condensing control, the visible user interface element displayed within the user interface, the detecting occurring while the segment is selected and the two or more frames are each visibly displayed within the selected segment, and the visibly condensing the selected segment comprising replacing the two or more frames with a visual indicator on the timeline to represent the condensed selected segment.

11. A computer readable medium comprising computer instructions stored thereon that, responsive to execution by a processor, perform operations comprising:
    displaying a timeline comprising multiple frames within a user interface;
    receiving user input to select, from within the displayed timeline, a segment comprising two or more frames of the multiple frames; and
    visibly marking the segment comprising two or more frames to indicate that the segment is selected in response to receiving the user input;
    visibly condensing the selected segment on the displayed timeline in response to detecting additional user input to a visible user interface element for activating a condensing control, the visible user interface element displayed within the user interface, the detecting occurring while the segment is selected and the two or more frames are each visibly displayed within the selected segment, and the visibly condensing the selected segment comprising replacing the two or more frames with a visual indicator on the timeline to represent the condensed selected segment.

12. The computer readable medium of claim 11, wherein the timeline is associated with at least one of an animation object, a video clip, an audio track, a set of images, or a plurality of events.

13. The computer readable medium of claim 11, wherein the visual indicator is a tear mark.

14. The computer readable medium of claim 11, wherein the computer instructions, responsive to execution by the processor, perform operations further comprising displaying a button associated with the segment of the timeline, wherein activating the button toggles between displaying the segment of the timeline and displaying the visual indicator.

15. A method, comprising:
    displaying, by a computer, a timeline within a user interface;
    receiving user input to select, from within the displayed timeline, a segment between a first point and a second point of the displayed timeline;
    visibly marking the selected segment of the displayed timeline to indicate that the segment is selected; and
    in response to detecting additional user input to a visible user interface element displayed within the user interface for activating a condensing control:
        visibly removing the selected segment from the displayed timeline; and
        displaying a marker on the timeline to represent the removed selected segment of the timeline.

16. The method of claim 15, wherein the timeline is associated with at least one of an animation object, a video clip, an audio track, a set of images, or a plurality of events.

17. The method of claim 15, wherein the receiving user input to select the segment of the timeline comprises receiving user input to select at least two frames associated with the timeline.

18. The method of claim 15, wherein the receiving user input to select the segment of the timeline comprises receiving user input to select at least two columns associated with the timeline, wherein each column comprises a plurality of layers.

19. The method of claim 15, further comprising adding a button associated with the segment of the timeline, wherein activating the button causes displaying of the segment of the timeline.

20. The method of claim 15, further comprising activating another control subsequent to said displaying the marker on the timeline, and in response, removing the marker from the displayed timeline and redisplaying the segment of the timeline.

21. The method of claim 20, wherein the another control is the marker.

22. A system, comprising:
   at least a memory and a processor configured to perform a method comprising:
   displaying a timeline within a user interface;
   receiving user input to select, from within the displayed timeline, a segment between a first point and a second point of the displayed timeline;
   visibly marking the selected segment of the displayed timeline to indicate that the segment is selected; and
   in response to detecting additional user input to a visible user interface element displayed within the user interface for activating a condensing control:
     visibly removing the selected segment from the displayed timeline; and
     displaying a marker on the timeline to represent the removed selected segment of the timeline.

23. A computer readable medium comprising computer instructions stored thereon that, responsive to execution by a processor, perform operations comprising:
   displaying a timeline within a user interface;
   receiving user input to select, from within the displayed timeline, a segment between a first point and a second point of the displayed timeline;
   visibly marking the selected segment of the displayed timeline to indicate that the segment is selected; and
   in response to detecting activation of a visible user interface element that is displayed within the user interface:
     visibly removing the selected segment from the displayed timeline; and
     displaying a marker on the timeline to represent the removed selected segment of the timeline.

24. The computer readable medium of claim 23, wherein the timeline is associated with at least one of an animation object, a video clip, an audio track, a set of images, or a plurality of events.

25. The computer readable medium of claim 23, wherein the segment of the timeline comprises at least two frames associated with the timeline.

26. The computer readable medium of claim 23, wherein the computer instructions, responsive to execution by the processor, perform operations further comprising displaying a button associated with the segment of the timeline, wherein activating the button initiates displaying of the segment of the timeline.

27. The computer readable medium of claim 23, wherein the computer instructions, responsive to execution by the processor, perform operations further comprising activating another control subsequent to said displaying the marker on the timeline, and in response, removing the marker from the displayed timeline and re-displaying the segment of the timeline.

* * * * *